CARRIER WAVE MODIFYING SYSTEM

Filed Nov. 29, 1952 2 Sheets-Sheet 1

INVENTOR.
STEPHEN W. MOULTON
JAMES S. BRYAN
BY
[signature]
ATTORNEY

INVENTOR.
STEPHEN W. MOULTON
JAMES S. BRYAN
BY
ATTORNEY

United States Patent Office 2,798,201

Patented July 2, 1957

2,798,201

CARRIER WAVE MODIFYING SYSTEM

Stephen Woods Moulton, Hatboro, and James S. Bryan, Philadelphia, Pa., assignors to Philco Corporation, Philadelphia, Pa., a corporation of Pennsylvania Application November 29, 1952, Serial No. 323,234

6 Claims. (Cl. 332—1)

This invention relates to improvements in electrical communication systems. More particularly, it relates to apparatus for modifying certain relationships between the intelligence representative modulation components of a single carrier wave.

It is known that a single carrier wave of predetermined nominal frequency can be produced with such modulation components that it represents two different intelligence signals. Such a single carrier wave may be formed by first producing a pair of separate carrier waves, of the same nominal frequency as the composite carrier wave but of mutually different phases, by then utilizing the different intelligence signals to modulate the respective amplitudes of different ones of these component carrier waves and by additively combining the two modulated component carrier waves to form the single composite carrier wave. This composite carrier wave will be subject to both amplitude and phase variations due to intelligence representative variations of the modulation components. Not only a carrier wave produced as hereinbefore outlined, but indeed any carrier wave which is subject to both amplitude and phase variations in accordance with intelligence can likewise be considered as being composed of the sum of two separate modulation components produced by amplitude modulation of differently phased component carrier waves with different intelligence signals, whether this is the actual method of formation of the composite carrier wave or not. It will be seen, hereinafter, that the analysis of certain transformations to which such a carrier wave may be subjected, is greatly facilitated by considering these separate modulation components rather than the composite carrier wave itself.

It is sometimes desired, for reasons which are explained hereinafter, to modify a composite carrier wave, having the aforedescribed modulation components in some predetermined phase and amplitude relationship, in such a way as to change either their phase or their amplitude relationship or both. It is apparent that this cannot be accomplished simply by variation of the amplitude or phase of the composite carrier wave, since such a variation would produce proportional changes in the two modulation components, so that their relative phases and amplitudes would remain unchanged. In fact, it was believed, heretofore, that it was entirely impractical to effect relative modification of the amplitudes and/or phases of these modulation components by operating on the composite carrier wave. Instead it was thought that this could be accomplished only by demodulating the composite carrier wave so as to recover therefrom the separate intelligence representative signals and to utilize these separated intelligence signals in some known manner to form a new carrier wave having modulation components in the desired amplitude and/or phase relationship. For example, the method described for the formation of the original carrier wave has also been used to form the new carrier wave, the component waves being then produced in their desired modified phase and amplitude relationship.

A situation, in which it is necessary to effect the aforementioned modification of certain relationships between the carrier wave modulation components, arises in the construction of color television receivers adapted for the reception of a signal which includes a carrier wave having modulation components respectively representative of different chromaticity components of a televised scene. It is now known that maximum variations in one of these chromaticity components are usually of considerably smaller amplitude than maximum variations in the other chromaticity component. Under these conditions, improved system noise performance can be obtained by boosting the component having the smaller variations, before transmission by the aforedescribed modulation technique, until its maximum variations become substantially equal to those of the larger component. This, then, produces a correspondingly distorted relationship between the modulation component amplitudes which, if uncorrected at the receiver, would cause the reproduced image to be improperly colored. Consequently the true relative maximum amplitudes of the chromaticity representative modulation components must be reestablished at the receiver. This necessitates the relative modification of the modulation component amplitudes.

Another situation, in which it is sometimes necessary to modify the relationship between these chromaticity representative modulation components, arises when it is desired to display the chromaticity intelligence represented by the received carrier wave on a single receiver cathode ray tube. As is well known, a cathode ray tube suitable for this purpose may have a screen structure composed of a large number of distinct phosphor elements which are so disposed that elements emissive of light of three different primary colors occur in repetitive sequence in the path of the screen-scanning cathode ray beam. For any geometrical configuration of these phosphor elements, there will then exist a phase relationship, between the two chromaticity representative modulation components, which yields optimum reproduction of their color intelligence when the carrier wave is directly applied to the beam intensity control grid electrode of the tube. Of course, the actual geometry of phosphor element distribution depends upon practical considerations of ease of manufacture. Consequently different manufacturers of television receivers may build sets with different distributions and may even wish to vary these distributions from time to time. The transmitted signal, on the other hand, must necessarily adhere to some uniform standard which cannot take into account all the possible variations in cathode ray tube screen construction. According to one proposed standard, for example, there is produced at the transmitter a carrier wave having two modulation components in mutual phase quadrature relationship and respectively representative of complementary chromaticity components of the televised scene. When it is desired to display such a carrier wave on a cathode ray tube screen having red, green and blue light emissive phosphor elements disposed at equal intervals, it is found that the phase relation between the two modulation components must be other than quadrature for best results.

As has been previously pointed out, modification of the amplitude and/or phase relationship between the modulation components of such a composite carrier wave was considered to be feasible only by demodulating the carrier wave, thereby recovering the original chromaticity signals in separate channels, and by using these separated signals to modulate other locally produced component carriers having the desired amplitude and/or phase relationships.

It is clear that such demodulation and remodulation involves the use of much complicated apparatus which adds materially to the complexity and cost of a color television receiver. This procedure is particularly objectionable when used in a receiver of that aforementioned kind wherein the chromaticity representative carrier wave could be applied directly to the cathode ray tube grid were it not for the required modification of the amplitude and/or phase relationship of its modulation components.

It is, accordingly, a primary object of the invention to provide improved means for modifying the relative amplitudes and/or phases of the intelligence representative modulation components of a carrier wave.

It is another object of the invention to provide improved means for operating on a modulated carrier wave so as to produce variations in the relative amplitudes and/or phases of those modulation components of equal nominal frequency and different phases of which one can consider the carrier wave to be composed.

It is still another object of the invention to provide means for modifying the relative amplitudes and/or phases of the modulation components of a carrier wave without the need for separating these modulation components during the process of modification.

It is a still further object of the invention to provide means for modifying the relative amplitudes and/or phases of the intelligence representative modulation components of a carrier wave without the need for demodulating this carrier wave during the process of modification.

It is a feature of the invention that frequency conversion of the modulated carrier wave can be carried out by the same means which are used to effect relative amplitude and/or phase modification of its modulation components.

While the invention will be described hereinafter in its application to a carrier wave having modulation components in fixed mutual phase relationship, it will be understood that it is equally applicable to the modification of the phase and amplitude relationships of components whose mutual phase relationship is subject to variations.

If a carrier wave, which can be considered as being composed of two intelligence representative modulation components, is heterodyned with an auxiliary signal, then there are produced two new carrier waves, at nominal frequencies respectively equal to the sum and difference of the frequencies of the original carrier wave and of the auxiliary signal and each of which can again be considered to be composed of two separate modulation components. Considering these newly produced modulation components, which will hereinafter be called "heterodyne modulation components" to distinguish them from the modulation components of the original, unheterodyned carrier wave, it will be noted that one pair of components will also be at a frequency equal to the sum of the frequencies of the original carrier waves and of the auxiliary signal, while the other pair will be at a frequency equal to the difference between the same frequencies. Furthermore, one heterodyne component of each pair bears the intelligence representative amplitude modulation of one of the original modulation components, while the other heterodyne component of each produced pair bears the intelligence representative modulation of the other original modulation component. Also, the same mutual phase relationship as existed between the original modulation components will exist between the members of each pair of heterodyne components, but referred, of course, to their particular heterodyne frequencies. However, while the magnitudes of the phase angles between the members of each pair of heterodyne components will thus be equal, the polarities of these angles will not be the same. More specifically, the sum frequency heterodyne components produced in the manner hereinbefore described will have a mutual phase angle of the same polarity as that of the original modulation components. The difference frequency components, on the other hand, will have a mutual phase angle of the safe magnitude but of the opposite polarity from that of the original modulation components. In other words, if one original modulation component leads the other in phase by a predetermined angle, then that sum frequency heterodyne component which bears the intelligence representative amplitude modulation of the originally leading modulation component will lead, by the same angle, that sum frequency component which bears the amplitude modulation of the originally lagging modulation component, while the difference frequency component which bears the amplitude modulation of the originally leading modulation component will lag that difference frequency component which bears the amplitude modulation of the originally lagging modulation component, again by the same angle.

Consequently, a pair of heterodyne components, formed at any given frequency by modulation of a carrier wave of the kind under consideration with an auxiliary signal, will have a mutual phase relationship of the same or of the opposite polarity from that of the modulation components of the original carrier wave, depending only upon whether the auxiliary signal frequency is lower or higher than the heterodyne frequency. The relative amplitudes of such a pair of heterodyne components will, of course, be unaffected by the heterodyning process and will be the same as those of the original carrier wave.

On the other hand, the phases and amplitudes of both members of such a pair of heterodyne components may be simultaneously controlled by adjustment of the phase and amplitude of the auxiliary signal, without affecting their mutual phase and amplitude relationships.

If there are formed two pairs of such heterodyne components by modulating the original carrier wave with two different auxiliary signals whose frequencies are so chosen that the pair of sum frequency heterodyne components produced by one auxiliary signal are at the same frequency as the pair of difference frequency heterodyne components produced by the other auxiliary signal, then one of these pairs of heterodyne components will have the same relative amplitudes as the modulation components of the original carrier wave and also a mutual phase angle of the same magnitude and polarity, while the other pair will also have the same relative amplitude as the modulation components of the original carrier wave and a mutual phase angle of the same magnitude but of opposite polarity.

If these two pairs of heterodyne components are now additively combined, there will be produced a single carrier wave, still at the same said frequency, and which can again be considered to be constituted of a pair of modulation components, one of these components resulting from the addition of that component in each heterodyne pair which bears the amplitude modulation of one original carrier wave modulation component and the other component resulting from the addition of that component in each heterodyne pair which bears the amplitude modulation of the other original carrier wave modulation component. The relative amplitudes and phases of these two resultant modulation components will depend upon the amplitude and phase of one pair of heterodyne components relative to the amplitude and phase of the other pair.

We have found that any desired amplitude and phase relationship may be obtained between the two modulation components which result from this additive combination by producing the two pairs of heterodyne components with appropriate relative amplitudes and phases.

Accordingly, apparatus embodying our invention includes means for modulating the original carrier wave, having modulation components whose amplitude and/or phase relationship it is desired to modify, with each of two different auxiliary signals whose frequencies are chosen as hereinbefore indicated, namely to produce two pairs of heterodyne modulation components at the same frequency. In the preferred form of our invention, the necessary amplitude and phase control of one pair of these heterodyne components relative to the other pair is achieved by control of the relative phases and amplitudes of the auxiliary signals prior to their utilization to modulate the original carrier wave. After the two pairs of heterodyne modulation components have thus been produced with appropriate relative amplitudes and phases by the aforementioned heterodyning process, they are supplied to additive combining means where they are recombined into a single carrier wave having the modulation components in their desired amplitude and/or phase relationship. Alternatively, a second carrier wave of exactly the same form as the original carrier wave, and having, therefore, the same modulation components as the latter, may be derived from the original carrier wave by conventional means, whereupon the relative amplitudes and phases of these two separate carrier waves may be controlled prior to modulation of both carrier waves with both of the aforementioned auxiliary signals.

If the frequency at which the carrier wave with controlled modulation components is formed is of no importance, then one of the auxiliary signals may be produced at any arbitrary frequency, the other auxiliary signal being then produced at a frequency which differs from the said arbitrary frequency by an amount equal to twice the original carrier wave frequency. If it is important that the new carrier wave be formed at some particular frequency, then the same relationship between the auxiliary signal frequencies obtains as before, and, in addition, the frequencies of the auxiliary signals must differ from that of the new carrier wave by equal amounts. The construction and operation of embodiments of our invention will be better understood from the following description in conjunction with the accompanying drawings wherein:

Figure 1:
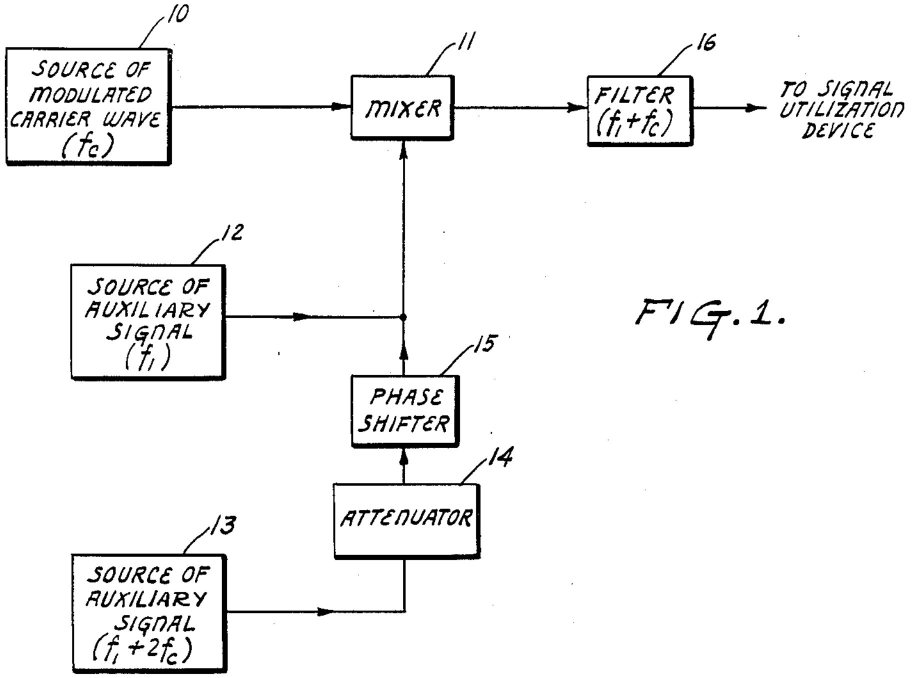
Figure 1 is a block diagram representative of a system which embodies our invention.

Referring now to Figure 1, there is illustrated, in block diagram, a source 10 of a modulated carrier wave whose output circuit is connected to one input circuit of a mixer 11. To the second input circuit of this mixer 11 there is supplied a signal from a source 12 of auxiliary signal and also from a source 13 of auxiliary signal, the latter by way of attenuator 14 and phase shifter 15. The output circuit of mixer 11 is connected to the input circuit of a band-pass filter 16, the output circuit of this filter being in turn connected to a suitable signal utilization device, not shown.

In operation, source 10 puts out a carrier wave of nominal frequency $f_c$, having two different intelligence representative modulation components in some predetermined amplitude and phase relationship. This carrier wave is heterodyned, in mixer 11, with an auxiliary signal of frequency $f_1$ supplied to this mixer from source 12. The same carrier wave from source 10 is also modulated in mixer 11 with a signal of frequency $f_1+2f_c$ from source 13. Heterodyning of the carrier wave from source 10 with the auxiliary signal from source 12 produces output components from mixer 11 at frequencies equal to the sum and difference of the frequencies of the signals from sources 10 and 12 respectively. Consequently, there appear, in the output circuit of mixer 11, signals of frequency $f_1+f_c$ and signals of frequency $f_1-f_c$. Likewise sum and difference frequency components of the respective input signals are produced by mixer 11 in response to the signals from source 10 and source 13. These are at frequencies $f_1+2f_c$ and $f_1+f_c$, respectively. Thus there are produced, by the operation of mixer 11, heterodyne components at a frequency $f_1+f_c$ due to the modulation of the carrier wave from source 10 with the auxiliary signals from each of sources 12 and 13. Moreover the components of frequency $f_1+f_c$ produced by heterodyning of the signals from sources 10 and 12 are sum frequency heterodyne components, while the components of frequency $f_1+f_c$ produced by heterodyning of the signals from sources 10 and 13 are difference frequency heterodyne components. If, as has been assumed, the carrier wave from source 10 comprises modulation components in a predetermined phase relationship, then the corresponding pair of heterodyne components produced by mixing with the signal from source 12 will have a mutual phase relationship of the same magnitude and polarity as the modulation components of the original carrier wave from source 10, while the corresponding pair of heterodyne components produced by mixing of the signals from source 10 and source 13 will have a mutual phase relationship of the same magnitude but of the opposite polarity.

By means of attenuator 14 and phase shifter 15, which the auxiliary signal from source 13 traverses on its way to mixer 11, the phase and amplitude with which the auxiliary signal from source 13 is supplied to mixer 11 can be controlled relative to the phase and amplitude of the auxiliary signal from source 12. Relative variations of these phases and/or amplitudes of the auxiliary signals, prior to their application to mixer 11, result in corresponding variations of the relative amplitude and/or phases of the pair of heterodyne components produced at frequency $f_1+f_c$ by mixing of the signals from sources 10 and 12, relative to that pair of heterodyne components which is also produced at frequency $f_1+f_c$ by mixing of the signals from sources 10 and 13. Thus, any arbitrary amplitude and/or phase relationship between these two pairs of heterodyne components can be produced by appropriate adjustment of attenuator 14 and phase shifter 15. These two pairs of heterodyne components at frequency $f_1+f_c$ are additively combined as, for example, by deriving them all from a common output circuit of mixer 11. Filter 16, to which these signals of frequency $f_1+f_c$ are then supplied, is transmissive of these signals to the substantial exclusion of signals of all other heterodyne frequencies produced by mixer 11. Accordingly, there is produced at the output of filter 16 a carrier wave of nominal frequency $f_1+f_c$ having modulation components representative of the same intelligence as the modulation components of the original carrier wave from source 10, but bearing an amplitude and/or phase relationship determined by the amplitude and phase relationship of the auxiliary signals of frequency $f_1$ and $f_1+2f_c$, respectively, which are supplied to mixer 11. It will be understood that, in order to transmit the intelligence representative modulation components of the carrier wave of nominal frequency $f_1+f_c$, the filter 16 must be signal transmissive at the modulation sideband frequencies of this carrier wave, as well as at the exact frequency of the carrier wave itself.

While a common mixer 11 has been shown for heterodyning both auxiliary signals with the original carrier wave, it will be understood that separate mixers may instead be used to heterodyne the different auxiliary signals with the carrier, the additive combination of the heterodyne components of frequency $f_1+f_c$ being then carried out at some later stage.

Figure 2:
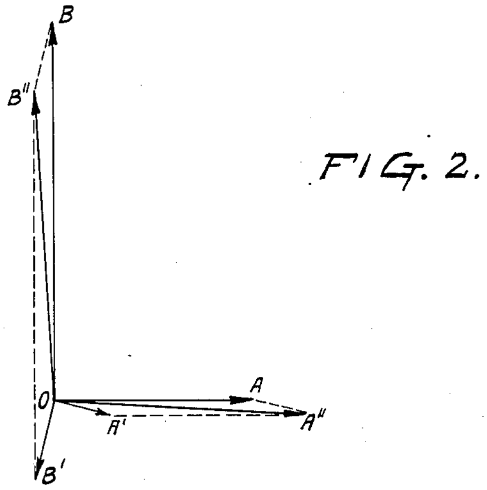
Figure 2 is a vector diagram which will be useful in explaining the operation of the system of Figure 1.

The foregoing is graphically illustrated in Figure 2 where vector OA represents one member of that pair of heterodyne components produced at frequency $f_1+f_c$ by the operation of mixer 11 on the signals from sources 10 and 12, while vector OB represents the other member of this same pair of heterodyne components. For purposes of illustration component OB has been shown as leading component OA by ninety degrees in phase and as having twice the amplitude of component OA. Assuming now that the auxiliary signal derived from source 13 has been delayed in phase shifter 14 by an angle $\theta$ relative to the auxiliary signal from source 12, and assuming further that the amplitude of this auxiliary signal has been reduced in attenuator 14 by factor K relative to the amplitude of the other auxiliary signal, then the interaction in mixer 11 between this auxiliary signal from source 13 and the original carrier wave components from source 10 will produce the second pair of heterodyne components represented in Figure 2 by the vectors OA′ and OB′. It is to be noted that the length of the vector OA′ differs from the length of the vector OA by the same factor K by which the amplitude of the auxiliary signal from source 13, after passage through attenuator 14, differs from the amplitude of the auxiliary signal from source 12. Furthermore, this component OA′ is delayed in phase behind the component OA by the same angle $\theta$ by which the auxiliary signal from source 13 is delayed in phase relative to the auxiliary signal from source 12 by the operation of phase shifter 15. The second heterodyne component OB′, produced by interaction in mixer 11 between the original carrier wave components from source 10 and the auxiliary signal from source 13, bears not only the same amplitude relationship K to the vector OB as do the amplitudes of the two auxiliary signals to each other but, in addition, this vector OB′ lags the vector OA′ by ninety degrees. The additive combination of the signals represented by the vectors shown in Figure 2 results in the production of two signals respectively represented by vectors OA″ and OB″. Vector OA″ is the result of the additive combination of vectors OA and OA′, while vector OB″ is the result of the combination of vectors OB and OB′. These resultant vectors are then representative of the amplitude and phase relationships which prevail at the output of mixer 11 and also at the output of filter 16 between the two modulation components of nominal frequency $f_1+f_c$ which are respectively representative of the same intelligence as the two modulation components of the original carrier wave from source 10. It is to be noted that the amplitude, as well as the phase relationship between these two resultant vectors OA″ and OB″ is substantially different from the amplitude and phase relationship between the initial subcarrier waves.

When it is desired to apply the apparatus of Figure 1 to the modification of the amplitude and phase relationship between the chromaticity representative modulation components of a color television signal, prior to its application to a color picture tube having a screen phosphor element distribution which requires such modification, the determination of the relationships between the amplitudes and phases with which the two auxiliary signals are produced depends, of course, upon the particular standards of the transmitted signal and also upon the particular phosphor element distribution.

In accordance with present standards of picture transmission, that carrier wave modulation component which gives rise to the heterodyne modulation component represented by vector OA in Figure 2 is proportional to a quantity $B-Y$ derived from the televised scene, where B is the instantaneous value of the blue light components of the scene and Y is the instantaneous value of the brightness of the same scene. The component represented by vector OB in Figure 2, which is transmitted in phase quadrature with this $B-Y$ representative component, is proportional to a quantity $R-Y$, were R is the instantaneous value of the red light components of the televised scene and Y is the same brightness value as before. By the application of conventional principles of colorimetry, it may be shown that, if a signal having the aforementioned chromaticity components and an appropriate monochrome signal is used to control the electron beam intensity of a cathode ray tube having a screen structure with phosphor elements emissive of red, green and blue light, respectively, disposed at equal intervals in the path of the electron beam, then the televised scene will be reproduced with improper color values. It can further be shown, that the proper components for application to the cathode ray tube of the kind here contemplated are formed if there is added, to a pair of modulation components having the same phase and amplitude relationship as those of the original carrier wave, a second pair of components of the form of those represented in Figure 2 by vectors OA′ and OB′, with a phase angle $\theta$ approximately equal to 7 degrees and with amplitudes approximately equal to one-fifth the amplitudes of the corresponding vectors OA and OB. This is approximately the condition which has been illustrated in the vector diagram of Figure 2.

For any other configuration of the screen phosphor elements it is possible, either by mathematical operations involving the application of well known principles of colorimetry, or by experiment, to determine the particular phase and amplitude relationship between the two intelligence representative modulation components applied to the cathode ray tube proper which must prevail in order to effect the accurate reproduction of the televised scene. By means of the apparatus illustrated in Figure 1, and more particularly by appropriate adjustment of the relative phases and amplitudes of the auxiliary signals from sources 12 and 13, any two original modulation components, irrespective of their initial phase and amplitude relationship may be transformed into any other two modulation components in any desired phase and amplitude relationship and bearing, respectively, the intelligence modulation of the two original components. The general relationships which govern this transformation are as follows.

If one of the modulation components of the original carrier wave is represented by the expression $$A(t) \cos 2\pi f_c t$$

and if the second modulation component of the original carrier wave is represented by $$B(t) \cos (2\pi f_c t+\phi)$$

where $A(t)$ is the amplitude, as a function of time, of one modulation component, $B(t)$ is the amplitude, as a function of time, of the second modulation component, $f_c$ is the nominal frequency of the original carrier wave, and $\phi$ is the phase angle between the modulation components of the original carrier wave as determined by the transmission standards and if, furthermore, one of the modulation components desired for application to the cathode ray tube proper is of the form $$K_1A(t) \cos [2\pi(f_c+f_1)t+\alpha]$$

and if the second modulation component desired for application to the cathode ray tube proper is of the form $$K_2B(t) \cos [2\pi(f_c+f_1)t+\phi+\beta]$$

where $K_1$ is the factor by which it is desired to have the amplitude of one modified modulation component differ from that of the corresponding original component, $K_2$ is the factor by which it is desired to have the amplitude of the second modified modulation component differ from the amplitude of its corresponding original component, $f_1$ is the amount by which the frequency of the produced carrier wave exceeds the frequency of the original carrier wave, $\alpha$ is the angle by which it is desired to have the phase of the first modified component differ from the phase of its corresponding original component and $\beta$ is the angle by which it is desired to have the phase angle of the second modified component differ from the phase of its corresponding original component, then the ratio $l$ between the amplitudes and the difference $\theta$ between the phase angles of the auxiliary signals (of frequencies $f_1+2f_c$ and $f_1$, respectively) can be expressed by the equations $$K_1=\sqrt{1+l^2+2l\cos\theta}$$

$$K_2=\sqrt{1+l^2+2l\cos(\theta-2\phi)}$$

$$\text{Tan }\alpha=\frac{l\sin\theta}{1+l\cos\theta}$$

and $$\text{Tan }\beta=\frac{l\sin(\theta-2\phi)}{1+l\cos(\theta-2\phi)}$$

Figure 3:
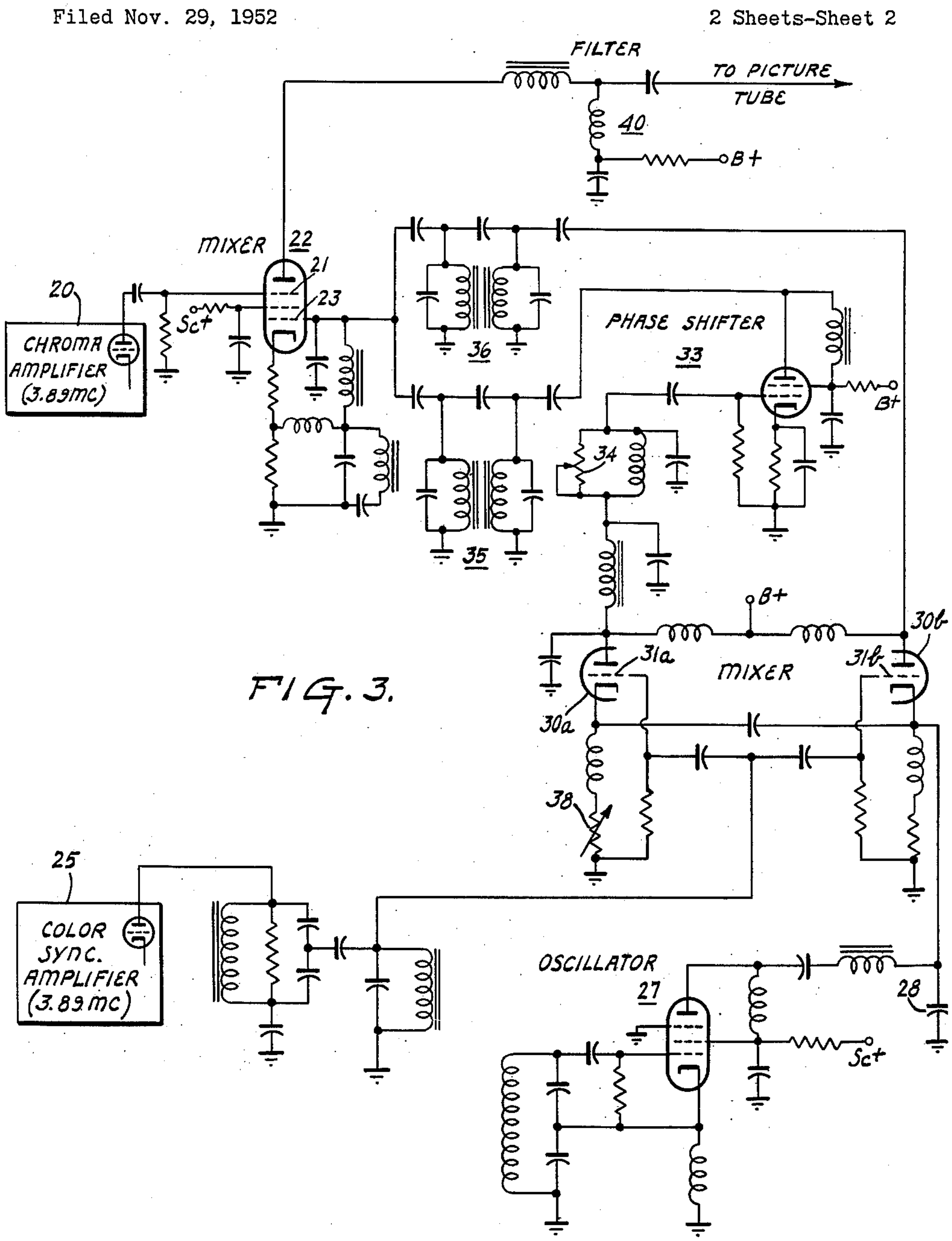
Figure 3 is a schematic representation of a preferred embodiment of our invention showing some of the details which, for purposes of simplification, were omitted from Figure 1.

A more detailed showing of a preferred embodiment of our invention, in a form suitable for use in a color television receiver, is shown in Figure 3 of the drawings to which more particular reference may now be had. As shown therein, the source of carrier wave having modulation components whose relative amplitudes and phases it is desired to modify may comprise the output circuit of a conventional amplifier 20 for chromaticity representative carrier waves. According to presently proposed transmission standards, these waves have a nominal frequency of 3.89 megacycles. The output signal of this amplifier 20 in supplied in conventional manner to control grid electrode 21 of pentode 22 which may be a conventional 6AS6 tube. Two auxiliary signals, produced in a manner hereinafter explained, are jointly applied to a second control grid electrode 23 of pentode 22. In the diagrammatic embodiment of Figure 1, these auxiliary signals were shown as being derived from two independent sources of signals 12 and 13. While it is perfectly feasible to produce these auxiliary signals in such independent sources, certain signals are produced in a conventional color television receiver for purposes unrelated to our invention which can be advantageously employed to produce the necessary auxiliary signals. For example, there is available in a conventional color television receiver, a so-called color synchronizing signal, which serves as a phase reference signal for the chromaticity representative carrier wave. This color synchronizing signal is a continuous signal of the same nominal frequency as the chromaticity representative carrier wave, 3.89 megacycles in the present case, and it has a phase, relative to the phases of each of the modulation components of the chromaticity carrier wave, which is fixed at the transmitter. Such a reference signal is produced at the output circuit of a conventional color sync amplifier 25. In certain proposed color television receiver systems there is also provided an oscillator, operative at some arbitrarily selected frequency which is preferably several times greater than the nominal frequency of the chromaticity representative carrier wave. This oscillator, which is shown in Figure 3 at 27 and which may take any conventional form, is normally utilized in maintaining accurate registry between the intervals during which the electron beam in impingent upon phosphor elements emissive of light of a particular color and the intervals during which the video signal which controls the intensity of this electron beam is representative of intelligence concerning the same color. A system for so utilizing the output signal of such an oscillator is shown and described in the copending U. S. patent application of Edgar M. Creamer, Jr. and Melvin E. Partin, Serial No. 240,324, filed August 4, 1951, and assigned to the assignee of the present invention. Suffice it to say, for the present purposes of explanation, that a continuous signal of some relatively high frequency, such as 31.5 megacycles, is developed across output capacitor 28 of oscillator 27. This 31.5 megacycle oscillator output signal is supplied to the cathodes of each of a pair of triodes 30*a* and 30*b* which may conveniently be the halves of a double triode of type 12AT7. To the control grid electrodes 31*a* and 31*b* of each of these triodes there is applied the 3.89 megacycle output signal of color sync amplifier 25. These triodes 30*a* and 30*b* then operate in conventional manner to heterodyne the signals respectively supplied thereto so that there appears in the output circuit of each triode a pair of heterodyne signals, at the sum and difference frequencies of the input signals. With input signals at the aforementioned frequencies of 31.5 megcycles and 3.89 megacycles, each triode produces one heterodyne component at 35.39 megacycles and another heterodyne component at 27.61 megacycles. The anode circuit of triode 30*a* further comprises a variable phase shifting device 33 which may be of any suitable conventional form. Adjustment of the potentiometer 34 in the input circuit of this phase shifter produces phase variations in the output signals from triode 30*a* in the range of 0 to 180 degrees. The output circuit of this phase shifter 33 is connected to a double tuned circuit 35 which is constructed in conventional manner to transmit only the sum frequency heterodyne component, at 35.39 megacycles, produced by triode 30*a* and to reject the difference frequency heterodyne component, at 27.61 megacycles, which is produced by this same triode. In the anode circuit of triode 30*b*, on the other hand, there is connected a double tuned circuit 36, which is conventionally constructed to transmit signals of the 27.61 megacycle difference heterodyne frequency produced by triode 30*b*, while rejecting signals at 35.39 megacycle sum frequency. The output circuits of double tuned circuits 35 and 36 are jointly connected to the aforementioned control grid 23 of mixer tube 22.

The signals of 35.39 and 27.61 megacycles, which are thus supplied to mixer tube 22 from the respective double tuned circuits, then constitute the necessary pair of auxiliary signals, differing in frequency by an amount equal to twice the nominal frequency of the chromaticity representative carrier wave from amplifier 20. By the action of mixer 22 on the signals thus supplied to its different input electrodes, there are produced, in the output circuit of this mixer, a number of heterodyne components including two pairs of such components at 31.5 megacycle nominal frequency, each pair corresponding to the two modulation components of the chromaticity reprsentative carrier wave from amplifier 20. These 31.5 megacycle components are separated from all other components by means of filter 40, to which the output signals of mixer 22 are supplied and which is constructed, in conventional manner, to transmit only signals of 31.5 megacycle nominal frequency, together, of course, with the sidebands resulting from intelligence modulation. The phase of one of the auxiliary signals, namely the 35.39 megacycle signal is, as has been indicated, controllable under the influence of the potentiometer 34 of phase shifter 33. While it is perfectly feasible to provide an attenuator in series with this phase shifter so as to render the amplitude of the 35.39 megacycle auxiliary signal controllable relative to that of the 27.61 megacycle auxiliary signal, we prefer to effect this amplitude control by means of a variable resistor 38 in the grid-to-cathode circuit of mixer tube 30*a*. The reason for this is that adjustment of this resistor controls the gain of the mixer tube and makes it possible to increase the amplitude of the 35.39 megacycle signal relative to that of the 27.61 megacycle signal as well as to decrease it. By setting the aforedescribed controls in accordance with the principles hereinbefore set forth for the adjustment of the relative amplitudes and phases of the auxiliary signals prior to their mixing with the original carrier wave, there is then produced, at the output of filter 40, a signal of 31.5 megacycle nominal frequency and having modulation components which bear respectively the same intelligence modulation as the two modulation components of the original chromaticity representative carrier wave from amplifier 20 but in a different phase and/or amplitude relationship.

Although the present invention has been described with reference to a specific embodiment, it will be understood that the inventive concept is susceptible of other forms of physical expression and, consequently, our invention is not to be limited to the specific disclosure but only by the scope of the appended claims.

We claim:

1. In an electrical system including a source of a first carrier wave modulated in amplitude and/or phase and representative of separate intelligence components of relatively varying amplitude and/or phase, means for converting said modulated carrier wave into a second carrier wave modulated in amplitude and/or phase and representative of separate intelligence components of predeterminably different relative amplitude and phase, said means comprising: a source of a first auxiliary signal; a source of a second auxiliary signal whose frequency exceeds the frequency of said first auxiliary signal by an amount substantially equal to twice the frequency of said first carrier wave; means for establishing a predetermined phase relation between said auxiliary signals; means for heterodyning both said auxiliary signals with said first carrier wave; and means for selectively deriving from said heterodyning means a modulated carrier wave at a carrier frequency which exceeds the frequency of said first auxiliary signal by an amount equal to the frequency of said first carrier wave and having sideband components representative of the modulation of said first carrier wave.

2. Apparatus according to claim 1 and further characterized in that said heterodyning means is a single mixer supplied with both said auxiliary signals and with said first carrier wave.

3. In an electrical system including a source of a first carrier wave having modulation components which may be represented mathematically by the expressions $$A(t)\cos 2\pi f_c t$$

and $$B(t)\ cos\ (2\pi f_c t+\phi)$$

where $A(t)$ and $B(t)$ are the respective amplitudes, expressed as functions of time, of said modulation components,
$f_c$ is the frequency of said carrier wave, and
$\phi$ is the phase angle between said components, means for converting said first carrier wave into a second carrier wave having modulation components which may be represented mathematically by the expressions $$K_1A(t)\cos[2\pi(f_c+f_1)t+\alpha]$$

and $$K_2B(t)\cos[2\pi(f_c+f_1)t+\phi+\beta]$$

where $K_1$ and $K_2$ are constants of proportionality respectively relating the amplitudes of the modulation components of said second wave to the amplitudes of the modulation components of said first wave,
$f_1$ is the amount by which the frequency of said second carrier wave exceeds that of said first wave,
$\alpha$ is the angle by which the phase of the derived component of amplitude $K_1A(t)$ differs from the phase of the component of amplitude $A(t)$, and
$\beta$ is the angle by which the phase of the derived component of amplitude $K_2B(t)$ differs from the phase of the component of amplitude $B(t)$, said means comprising: a source of a pair of auxiliary signals, of frequencies respectively equal to $f_1$ and $2f_c+f_1$, the amplitude of said auxiliary signal of frequency $2f_c+f_1$ being related to the amplitude of said auxiliary signal of frequency $f_1$ by a ratio $l$, means for establishing the phases of said auxiliary signals so that they differ by an angle $\theta$ such that $$K_1=\sqrt{1+l^2+2l\cos\theta}$$

$$K_2=\sqrt{1+l^2+2l\cos(\theta-2\phi)}$$

$$\text{Tan }\alpha=\frac{l\sin\theta}{1+l\cos\theta}$$

and $$\text{Tan }\beta=\frac{l\sin(\theta-2\phi)}{1+l\cos(\theta-2\phi)}$$

means for heterodyning both said auxiliary signals with said first carrier wave, and means for selectively deriving from said heterodyning means a modulated carrier wave at a carrier frequency equal to $f_c+f_1$ and having sideband components representative of the modulation of said first carrier wave.

4. In an electrical system including a source of a first carrier wave modulated in amplitude and/or phase and representative of separate intelligence components of relatively varying amplitude and/or phase and of a signal of reference phase for said carrier wave, means for converting said modulated carrier wave into a second carrier wave modulated in amplitude and/or phase and representative of separate intelligence components of predeterminably different relative amplitude and phase, said means comprising: means for deriving, from said signal of reference phase, a first auxiliary signal, also of said reference phase and of a predetermined frequency; means for deriving, from said signal of reference phase, a second auxiliary signal also of said reference phase and of a frequency which exceeds the frequency of said first auxiliary signal by an amount substantially equal to twice the frequency of said first carrier wave, means for heterodyning both said auxiliary signals with said first carrier wave, and means for selectively deriving from said heterodyning means a modulated carrier wave at a carrier frequency which exceeds the frequency of said first auxiliary signal by an amount substantially equal to the frequency of said first carrier wave and having sideband components representative of the modulation of said first carrier wave.

5. In an electrical system including a source of a first carrier wave of carrier frequency $f_c$ modulated in amplitude and/or phase and representative of separate intelligence components of relatively varying amplitude and/or phase, and also including a source of a signal of said frequency $f_c$ and of reference phase for said intelligence components, means for converting said first carrier wave into a second carrier wave having modulation components in different mutual amplitude and/or phase relationship, said means comprising: a source of a signal whose frequency exceeds the frequency $f_c$ of said first carrier wave by an arbitrarily determined amount $f_1$, a first mixer having a first input circuit supplied with said signal of reference phase and having a second input circuit supplied with said signal of frequency $f_c+f_1$, said mixer being responsive to said supplied signals to produce sum and difference frequency heterodyne components of the said signals supplied to different input circuits, means for establishing a predetermined phase relation between said heterodyne components, a second mixer having a first input circuit supplied with both said heterodyne components and having a second input circuit supplied with said first carrier wave, said second mixer being responsive to heterodyne each of said heterodyne components with said first carrier wave, and means for deriving from said second mixer a carrier wave of carrier frequency $f_c+f_1$ and having sideband components representative of the modulation of said first carrier wave.

6. In an electrical system including a source of a first carrier wave of frequency $f_c$ having modulation components in predetermined mutual phase relationship, said modulation components having amplitudes respectively representative of different signal intelligence, and means for converting said first carrier wave into a second carrier wave having modulation components in controllable mutual amplitude and phase relationship, each of said last-named modulation components to bear the intelligence representative amplitude modulation of a different one of the modulation components of said first carrier wave, said means comprising: a source of a first auxiliary signal of independently determined frequency $f_1$, means for producing a second auxiliary signal whose frequency exceeds the frequency of said first auxiliary signal by an amount substantially equal to twice said frequency $f_c$ and whose phase bears a predetermined relation to the phase of said first auxiliary signal, means for heterodyning both said auxiliary signals with said first carrier wave, and means for selectively deriving from said heterodyning means a carrier wave of carrier frequency $f_c+f_1$ and having sideband components representative of the modulation of said first carrier wave.

References Cited in the file of this patent

UNITED STATES PATENTS

| | | |
|---|---|---|
| 1,882,772 | Callahan | Oct. 18, 1932 |
| 2,498,242 | Boykin | Feb. 21, 1950 |
| 2,580,903 | Evans | Jan. 1, 1952 |
| 2,583,573 | Jaynes | Jan. 29, 1952 |
| 2,619,547 | Ross | Nov. 25, 1952 |
| 2,589,387 | Hugenholtz | Mar. 18, 1952 |